Figure 1:
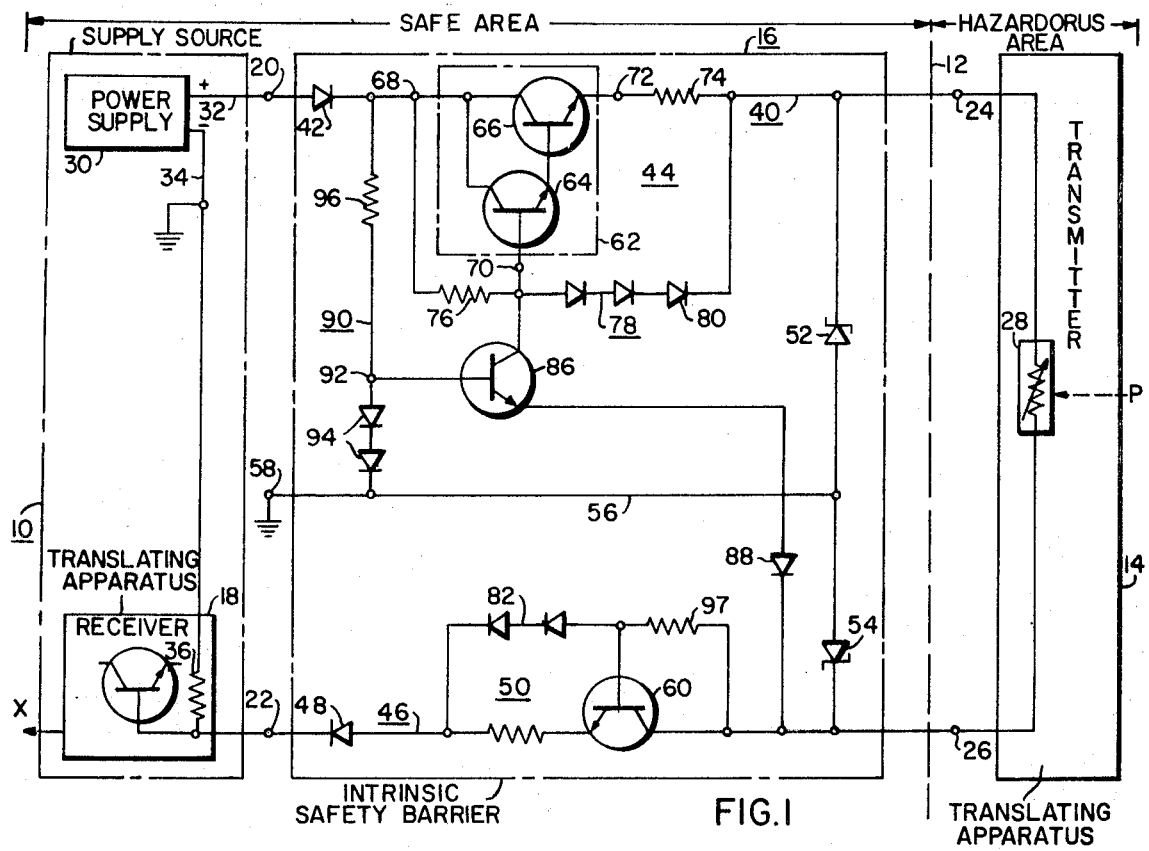

United States Patent

Miller, Jr.

[15] 3,684,924

[45] Aug. 15, 1972

[54] ELECTRICAL SYSTEM WITH ENERGY BARRIER

[72] Inventor: Edward J. Miller, Jr., Tempe, Ariz.

[73] Assignee: Westinghouse Electric Corporation, Pittsburgh, Pa.

[22] Filed: Sept. 10, 1971

[21] Appl. No.: 179,355

[52] U.S. Cl. .................. 317/18 B, 307/36, 307/92, 307/149, 317/33 VR, 323/9, 340/253 B, 340/256
[51] Int. Cl. .......................... H02h 3/14, H02h 9/00
[58] Field of Search ..317/9 R, 18 B, 33 VR, 31, 149, 317/154; 340/253 B, 248, 255, 256; 307/92, 94, 136, 149, 36, 318; 324/51; 323/4, 9

[56] References Cited

UNITED STATES PATENTS

| | | |
|---|---|---|
| 3,309,542 | 3/1967 | Elliot .................... 307/136 |
| 3,445,679 | 5/1969 | Meyer et al ............ 307/136 |
| 3,431,486 | 3/1969 | Fruehling et al ........... 323/9 |
| 3,571,608 | 3/1971 | Hurd ...................... 317/31 |
| 3,581,152 | 5/1971 | Hunt .................. 340/255 X |
| 3,631,264 | 12/1971 | Morgan ............... 307/318 X |

Primary Examiner—Gerald Goldberg
Attorney—F. H. Henson et al.

[57] ABSTRACT

An electrical system wherein an intrinsic safety barrier between electrical field apparatus and a DC supply source therefor includes voltage threshold devices connected from both lines at the field end to ground to protect against excess voltages, and current limiters in both lines between the source and field ends for preventing current above a predetermined value from flowing in the lines regardless of voltage or loading values. The current limiter in one line includes an electric valve in series in the line, which valve is turned OFF in response to loss of the aforementioned ground connection. Diodes in both lines oppose wrong polarity voltages that might be applied thereto.

15 Claims, 2 Drawing Figures

PATENTED AUG 15 1972　　　　　　　　　　　3,684,924

3,684,924

ELECTRICAL SYSTEM WITH ENERGY BARRIER

BACKGROUND OF THE INVENTION

Many industrial processes involve operations, changes, reactions, movements, of and relative to work products, that take place in potentially hazardous areas due for example to inflammable gases or vapors. Electrical monitoring and operating equipment located in such hazardous areas is usually connected to a supply source including controllers and/or instrumentation located in a safe area. In such systems, it is necessary that the field equipment (in the hazard area) not only be safe in normal operation but also in case of fault at the source end be protected against abnormal voltages and currents which could ignite the gas or cause electrical injury to personnel at the field equipment end of the system. Various schemes have been proposed to provide a protective energy barrier between the source and field equipment. Different types are disclosed in U.S. Pat. Nos. 3,527,984, 3,527,985 and 3,571,608. Also there have been proposed circuits similar to 3,527,985 but having a similar zener-resistor combination not only for the outgoing DC line but also for the return DC line, with zeners connected from both lines to ground. Some of these systems are too complex others, while protecting against some faults, do not protect against other faults.

SUMMARY OF THE INVENTION

This invention relates to an electrical system having a supply source at one end connected to supply DC power to field equipment at the other end through an energy barrier which includes active current limiters in both DC lines and voltage limiting threshold devices connected from the field end of each DC line to ground. Means is also provided for opening one of the lines in case of loss of the aforementioned ground connection. Also diodes in both lines at the source end oppose accidentally applied reverse polatity voltages.

In accordance with one embodiment of the invention, each current limiter includes a transistor deivice with its collector-emitter path in series with an emitter resistor in the main load current path. An impedance connected between the base and a point on the collector side of the circuit supplies turn-on bias. A current limiting function is given to the transistor device by means of a network including a diode circuit connected from the base to the distal end of the emitter resistor and which diode circuit is characterized by a total number of series diode voltage drops (or the equivalent) equal to the number of diode voltage drops in the base-emitter path plus one, whereby the maximum value of current which can flow in the main load current path will be limited to that value which causes the sum of the voltages across the emitter resistor and emitter-base junction to equal the voltage drop across the diode circuit. The status of the base voltage on the transistor of one of the current limiters is changed to a turn-OFF condition in response to the loss of the aforementioned ground connection.

DRAWINGS

Figure 2:
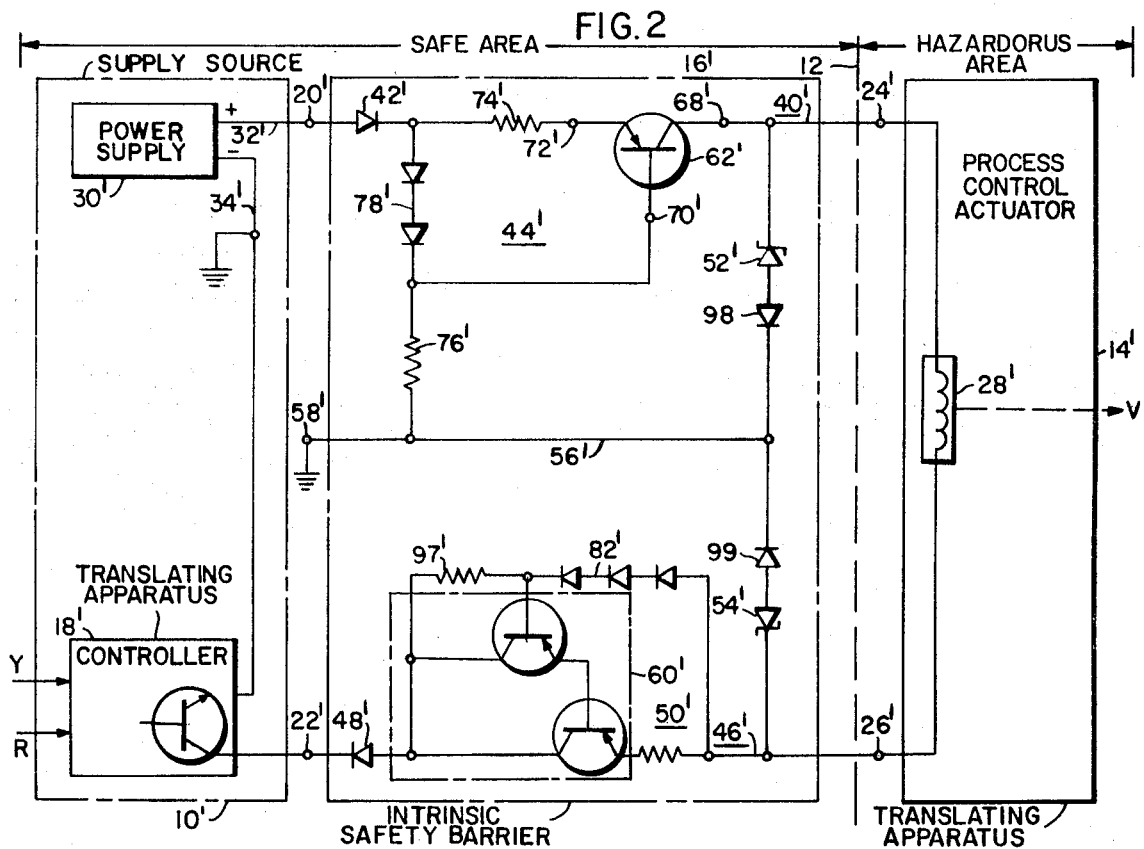

FIGS. 1 and 2 are diagrams illustrating different embodiments of the invention.

PREFERRED EMBODIMENTS OF THE INVENTION

Each of the systems shown in FIGS. 1 and 2 include a supply source (indicated at 10 and 10' in FIGS. 1 and 2) located in a safe area for supplying power to field equipment in a hazardous area symbolically separated from the safe area by dashed line 12. The field equipment is a load on the supply source and is shown as translating apparatus. In FIG. 1, this translating apparatus is indicated at 14 and is in the form of a transmitter of information representing a process variable for example pressure. While in FIG. 2, the translating apparatus in the field equipment is shown at 14' as a process control actuator for example a valve operator. A safety barrier at 16 and 16' in the respective FIGS, is interposed between the supply source and the field equipment to protect the latter from excess voltages and currents due to faults occurring in the system, for example, inadvertent short to ground, above normal voltages, and reverse polarity voltages. Barriers for such purposes are variously referred to in the art as energy barriers, safety barriers, intrinsic safety barriers, protective circuits, etc.

Since the main thrust of the protection is directed to the field equipment, that side of the barrier may conveniently be referred to as the output side or field end, while the other side to which the power supply is connected may be termed the input side. Thus, the circuit connected to the input side of the barrier may be referred to as a supply source even though it generally includes, besides the actual power source another load or translating apparatus. In FIG. 1, this translating apparatus shown at 18 is a receiver that responds to the transmitter 14, while in FIG. 2 this translating apparatus is at 18' in the form of a controller to which the control process actuator 14' responds.

Turning now to specifics of the embodiment of FIG. 1, the safety barrier 16 includes input conductors or terminals 20 and 22 connected to the supply source 10 and output conductors or terminals 24 and 26 connected to the transmitter 14. The latter may for example comprise an impedance 28 connected between conductors 24 and 26 that varies in response to a process variable for example pressure P in a fluid line.

Supply source 10 includes a DC power supply 30 having positive and negative output lines 32 and 34. Line 32 is connected to input terminal 20 of the barrier 16, while line 34 is connected through the translator 18 to input terminal 22 of the barrier 16. Thus translator 18 and power supply 30 are connected in series between terminals 20 and 22. Translator 18 is shown as a receiver which responds to the impedance variations of the transmitter 14, and may for example be an indicating device or the input driver of the controller for remotely controlling a process control actuator in the field. Receiver 18 is shown as having an input impedance 36 in series with and therefore a load on the power supply 30.

Terminal 20 is connected to terminal 24 through a circuit 40 including in series a diode 42 and a current limiter 44. The latter is arranged to prevent currents above a predetermined value from flowing between terminals 20 and 24, regardless of the applied voltage values or loading values, thus also limiting the current which can flow into terminal 24 and the field equipment 14. The current limit value is chosen to be below the critical value which could cause an accident such as explosion in the hazard area. Terminal 26 is connected to terminal 22 through a circuit 46 that includes a diode 48 and a current limiter 50 which limits the current between terminals 22 and 26 to a predetermined value.

In order to protect the field equipment from dangerously high voltages, voltage limiters 52 and 54 are connected from the field ends of circuits 40 and 46 to ground. More specifically, the voltage limiters are connected from conductors 24 and 26 to a ground conductor 56 that is connected to ground at 58. The voltage limiters are shown as voltage threshold devices, for example Zener diodes whose threshold or zener voltage is selected to be below the critical or hazardous value. Thus, the zener voltage is above the normal operating voltage.

Diodes 42 and 48 provide protection against the transfer of excess of energy due to inadvertent application of reverse or wrong polarity on terminal 20 or terminal 22.

Current limiters 44 and 50 operate in generally the same manner, except that limiter 50 is shown with a conventional transistor device 60 while limiter 44 uses a compound transistor device 62 formed by two conventional transistors 64 and 66 in Darlington configuration. It should be understood that both a single transistor and a compound or multiple transistor configuration fall within the general term "transistor device" as used herein.

As is the case with a conventional transistor device, compound transistor device 62 is also provided with the three terminations of a transistor, i.e., collector terminal 68, base terminal 70, and emitter terminal 72. It should be noted that the base emitter voltage drop of transistor device 62 is essentially the sum of the base-emitter drops of the component transistors 64 and 66. Also, the base-emitter path of circuit of transistor device 62 extends from base terminal 70 through the emitter junctions of the component transistors to emitter terminal 72. Input terminal 20 is connected through diode 42 to collector terminal 68, and emitter terminal 72 is connected through an emitter resistor 74 to output terminal 24. Thus, diode 42, the collector-emitter path of transistor device 62, and the resistor 72 are in series in the current path 40.

A biasing resistor 76 connected from the base 70 of transistor device 62 to a point in the circuit on the collector side of the transistor, forward biases the transistor rendering it conductive and allowing load current to flow through circuit 40, that is from terminal 20 to terminal 24, when supply source 10 applies operating voltage of the proper polarity to terminals 20 and 22. Resistor 74 and a diode circuit 78 connected between the base terminal 70 and the distal end of emitter resistor 74, i.e., across the series combination of the emitter-base path and the emitter resistor provide to the transistor device 62 a predictable current limiting function, which will limit the value of load current to a predetermined value regardless of the values of applied voltages and/or circuit loading. This current limiting arrangement is known in the prior art, and is characterized by operative relations wherein the maximum value of load current which can flow from terminal 20 to terminal 24 is limited to that value at which the sum of the base-emitter voltage drop of transistor device 62 and the voltage drop across emitter resistor 74 is equal to the voltage drop across the diode circuit 78. The base-emitter of transistor 62 is equal to the sum of the base emitter drops of transistors 64 and 66 and is matched by the sum of the drop across two of the diodes of the diode circuit 78. The third diode 80 and the resistance value of resistor 74 are selected to provide equal voltage drops when the load current reaches the desired limiting value.

Although the Darlington configuration is preferred for its increased sensitivity and gain, current limiter 50 is shown with a conventional transistor device 60 merely to illustrate a generally functional equivalent except for input impedance and gain differences. The general principle of operation for both limiters 44 and 50 is the same. That is, the maximum current is limited to that value at which the sum of the voltage drops across the base-emitter path and the emitter resistor equal the voltage drop across the diode circuit connected between the base of the transistor and the distal end of the emitter resistor. Since the base-emitter path of transistor 60 has only one base-emitter junction, its drop can be matched by one diode. Thus, the diode circuit 82 has only two diodes, one to match the base-emitter drop and the other to match the drop across the emitter resistor at the critical or limit value of load current. From the above description, it should be evident that the transistor devices of the current limiters 44 and 50 may be different from each other as illustrated, or both may be the same with either compound transistor devices such as the Darlington configuration shown at 62, or conventional transistor devices such as shown at 60.

It should now be apparent that the entire system is a current loop or main load current path beginning at the power supply 30 and including in series: power supply output line 32; the outgoing leg or current path 40 of the barrier 16; the field load 14; the return current path 46 of the barrier 16; the second load 18 at the input or control end of the barrier; and back to the power supply 30 via the power supply output line 34. The main load current path through the outgoing circuit 40 is through the series combination of diode 42, the collector-emitter path of transistor device 62, and the emitter resistor 74. In like manner, the main load current path through the circuit 46 is through the collector-emitter path of transistor device 60, the emitter resistor and the diode 48. With the application of the normal operating voltage of proper polarity by the power supply 30, the transistors 62 and 60 are biased ON, and current flows through the current loop or load current path. Impedance variation in either load 14 or load 18 will correspondingly vary the load current thereby transmitting information through the other load.

As hereinbefore expressed, the intent of the invention is to provide a barrier which will limit both current and voltage to the field equipment. A safe current limit value for hydrogen atmosphere would be approximately 40 ma at a voltage limit of approximately 30 volts. Accordingly, the parameters of the voltage limiting elements and of the current limiters are selected to limit the voltage of 30 volts and the load current to 40 ma.

Thus, the voltage limiting devices 52 and 54 are chosen to limit the voltage as measured to ground to 30 volts. In the case of the Zener diodes, shown, this is effected by choosing diodes having a zener or threshold voltage of 30 volts each. In the case of the current limiters 44 and 50, the emitter resistor is chosen to have a voltage drop equal to 1 diode drop when the load current reaches the selected maximum or limit value, which in the example is 40 ma.

From the foregoing description taken in connection with an inspection of FIG. 1, it should be apparent that the circuit of FIG. 1 provides the following safety features: (1) diode 42 prevents negative voltages applied at terminal 20 from reaching the field terminals 24 and 26 and the load thereacross; (2) diode 48 prevents positive voltages applied at terminal 22 from reaching the field terminals 24 and 26 and the load thereacross; (3) current limiter 44 prevents current greater than the maximum value dictated by the selected parameters of the limiter from flowing through a field terminal under faults applied at conductors 24 and 26; and (4) the combination of current limiter 44 and voltage limiter 52 prevent currents greater than the aforementioned maximum value or voltages greater than 30 volts from reaching the field terminal for large positive voltages applied to terminal 20.

Protection in case of loss of ground at conductor 58, is provided by an arrangement including a normally OFF switching device for example a transistor 86, which in response to such loss of ground is turned ON to change the input bias on transistor 62 thereby to turn the latter OFF. The collector-emitter path of transistor 86 is connected in series with a diode 88 between base 70 of the transistor device 62 and conductor 26. Transistor 86 is normally biased OFF by an arrangement including a voltage divider 90 connected from the collector side of the circuit 40 to ground conductor 56 and having an intermediate tap 92 connected to the base of transistor 86. Voltage divider 90 includes a pair of diodes 94 on the ground side of tap 92, and a resistor 96 on the opposite side of the tap.

In normal operation, with ground connection intact at terminal 58, transistor 86 is biased OFF and collector resistor 76 forward biases the base-emitter path of transistor device 62 thus to turn ON transistor device 62. In the meantime transistor 60 is also biased ON by its collector resistor 97. Thus the transistors 62 and 60 permit load current to flow substantially unimpeded through the load current loop including the translating apparatus 14 at the field end and the translating apparatus 18 at the input end. In case of loss of ground at terminal 58, the lower end of the voltage divider 90 connects through the zener diode 54 to conductor 26, thereby applying a turn-ON bias to the base of transistor 86 thus turning this transistor ON, thereby applying a more negative bias to the base of transistor 62 to turn it OFF. This of course opens the main load current path until the fault is corrected by reestablishing the ground connection. Automatic shut-off in case of loss of ground is important from the standpoint not only of safety but also of maintenance considerations. Without the automatic shut-off, the system has to be checked or monitored often enough to assure integrity of ground.

Instead of a receiver, translating apparatus 18 may be a controller, and translating apparatus 14 may be an actuator for operating a process control device for example a valve, in which case the actuator 14 would respond to load current variations produced by the controller 18 in response to input signals or drive (manual, electrical, or other) applied to the input of controller 18.

FIG. 2 illustrates an embodiment of the invention which has most of the safety features of the system of FIG. 1, but employs PNP instead of NPN transistors in the current limiters, and a different arrangement for providing automatic cut-off in response to loss of ground.

The current limiting and voltage limiting components of the barrier 16' that generally correspond to those of barrier 16 in FIG. 1, bear the same reference numbers, but are primed. Although it may be a compound transistor device such as a Darlington, transistor device 62' of current limiter 44' is shown as a conventional transistor. On the other hand, the transistor device 60' of the current limiter 50' is shown as a compound transistor device employing the Darlington configuration, although it could be a conventional transistor device utilizing only one transistor. The current limiting function of both limiters (44' and 50') is produced in generally the same manner as by the current limiters in FIG. 1. However with respect to transistor device 62' there is a variation in the turn-ON bias circuit, in that resistor 76' which provides turn-ON bias is connected between the base terminal 70' of transistor device 62' and the ground conductor 56'. Inspection of the circuit shows that broadly, resistor 76' is connected between the base of transistor device 62' and a point on the collector side (referenced to transistor device 62') of the main current loop. It may be noted that with reference to transistor device 62', the collector side of the main current loop extends from the collector terminal 68' to the (−) terminal 34' of power supply 30', while the emitter side of the main current extends from the emitter terminal 72' to the (+) terminal 32 of the power supply 30'.

In normal operation with normal operating voltage applied by the supply source 10' to the input terminals 20' and 22', bias resistor 76' supplies turn-ON bias to transistor device 62' and thus, with transistor 60' also turned ON, allows load current to flow through the main current path, which of course includes the translating apparatus 14'. However, in case of loss of ground at terminal 58', the base of transistor device 62' becomes as positive as the emitter of that transistor device, thereby opening or breaking the main current path. The system is thereby shut down until the ground connection is restored. It may be noted that when ground is lost at terminal 58', diodes 98 and 99 prevent the lower end of resistor 76' from "reaching" ground or any other point of relatively negative potential. It bears repeating that the reason for automatic cut-off in case of loss of ground is that, without ground the voltage limiting protection of the voltage limiters 52' and 54' is lost.

In the circuit of FIG. 2, for any voltage ranging from negative to positive values at terminal 20', the output voltage will be between zero and the threshold or zener voltage value of the voltage limiters 52' and 54', for example 30 volts, and the output current at terminals 24' and 26' cannot be greater than the predetermined maximum current value dictated by the selected parameters of the current limiting components as hereinbefore described relative to FIG. 1. For voltages between zero and positive values at terminal 22', the same results are found as above for terminals 24' and 26'. For voltages between zero and negative values at terminal 22', the current is still limited as above, but the voltage is not.

The systems of FIG. 1 and FIG. 2 may be combined by connecting the output line X of receiver 18 in FIG. 1 to the signal input line Y of controller 18' in FIG. 2. A reference signal R representing a desired condition may be applied to the controller and summed with the input signal on Y to provide an error signal for determining the output of the controller. Thus the transmitter 14 (FIG. 1) transmits condition signals for example representing fluid pressure P of a fluid line to receiver 18 (FIG. 1) whose output is fed to the input of controller 18' (FIG. 2) to provide an output to which the process control actuator 14' responds to control the process condition for example by operating a valve V to control the pressure P. By way of example a solenoid for operating the valve V is symbolized at 28' and shown connected between terminals 24' and 26'. In the above arrangement, the power supply sources 30 and 30' may be a single common source for both systems.

It should be understood that the disclosed embodiments and components are employed by way of example only and are not intended to limit the invention to the specific example shown.

I claim:

1. An electrical system comprising;
   A. a first set of conductors including first and second conductors for connection to a supply source;
   B. a second set of conductors including third and fourth conductors for connection to a load;
   C. ground conductor means for connection to ground; and
   D. protective energy barrier means interposed between the first and second sets of conductors, said energy barrier means comprising
      1. first current limiting means connected between the first and third conductors for preventing currents greater than a predetermined value from flowing between those conductors regardless of applied voltage and loading values,
      2. second current limiting means connected between the second and fourth conductors for preventing currents greater than a certain value from flowing between those conductors regardless of applied voltage and loading values,
      3. first threshold voltage means connected between the third conductor and the ground conductor means for limiting voltage at said second set, and
      4. second threshold voltage means connected between the fourth conductor and the ground conductor means for limiting voltage at said second set.

2. The combination as in claim 1 wherein first asymmetric current conduction means is connected between the first conductor and the first current limiter, and second asymmetric current conduction means is connected between the second conductor and the second current limiter, the forward direction of said first and second asymmetric current conduction means being in the direction of load current in the normal operating mode of the apparatus.

3. The combination as in claim 1 wherein one of said current limiting means includes a controllable electric valve in the path of load current, and control circuit means for the valve, said control circuit means being connected to said ground conductor means and being responsive to loss of connection between the ground conductor means and ground to turn off said valve.

4. The combination as in claim 3 wherein first asymmetric current conduction means is connected between the first conductor and the first current limiter, and second asymmetric current conduction means is connected between the second conductor and the second current limiter, the forward direction of said first and second asymmetric current conduction means being in the direction of load current in the normal operating mode of the apparatus.

5. The combination as in claim 1 wherein a supply source is connected to the first and second conductors, and a load is connected to the third and fourth conductors.

6. The combination as in claim 5 wherein said supply source comprises a power source and a second load, the first mentioned load comprises first translating means, said second load comprises second translating means, and one of said translating means responds to the other translating means.

7. The combination as in claim 6 wherein the first translating means comprises transmitting means responsive to a process condition, and the second translating means comprises receiving means responsive to said transmitting means.

8. The combination as in claim 6 wherein the second translating means comprises controller means and the first translating means is responsive to the second translating means and comprises process control actuating means.

9. The combination as in claim 5 wherein one of said current limiting means includes a controllable electric valve in the path of load current, and control circuit means for the valve, said control circuit means being connected to said ground control conductor means and being responsive to loss of connection between the ground conductor means and ground to turn off said valve.

10. The combination as in claim 6 wherein one of said current limiting means includes a controllable electric valve in the path of load current, and control circuit means for the valve, said control circuit means being connected to said ground conductor means and being responsive to loss of connection between the ground conductor means and ground to turn off said valve.

11. The combination as in claim 9 wherein first asymmetric current conduction means is connected between the first conductor and the first current limiting means, and second asymmetric current conduction means is connected between the second conductor and the second current limiting means, the forward direction of said first and second asymmetric current conduction means being in the direction of load current in the normal operating mode of the apparatus.

12. The combination as in claim 10 wherein first asymmetric current conduction means is connected between the first conductor and the first current limiting means, and second asymmetric current conduction means is connected between the second conductor and the second current limiting means, the forward direction of said first and second asymmetric current conduction means being in the direction of load current in the normal operating mode of the apparatus.

13. The combination as in claim 1 wherein each said current limiting means comprises:
1. a transistor device whose collector-emitter circuit is in the load current path,
2. an emitter resistor connected to the emitter of the transistor device and in series with the collector-emitter circuit in the load current path, and
3. a voltage divider connected across said series combination of collector-emitter circuit and emitter resistor and having an intermediate tap connected to the base terminal of said transistor device.

14. The combination as in claim 1 wherein each said current limiting means comprises:
1. a transistor device whose collector-emitter circuit is in the load current path,
2. an emitter resistor connected to the emitter terminal of the transistor device and in series with the collector-emitter circuit in the load current path,
3. means connected to the base terminal of the transistor device for forward biasing the base-emitter path thereof, and
4. diode means connected between said base terminal and the distal end of said emitter resistor.

15. The combination as in claim 14 wherein at least one of said transistor devices is a Darlington configuration compound transistor device.

* * * * *